United States Patent
Lin et al.

(10) Patent No.: US 11,461,878 B2
(45) Date of Patent: Oct. 4, 2022

(54) METHOD AND DEVICE FOR ELIMINATING RING EFFECT

(71) Applicant: Quanta Computer Inc., Taoyuan (TW)

(72) Inventors: Yeh Lin, Taoyuan (TW); Wen-Chu Yang, Taoyuan (TW); Chi-Hsien Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 203 days.

(21) Appl. No.: 16/933,150

(22) Filed: Jul. 20, 2020

(65) Prior Publication Data
US 2021/0174480 A1    Jun. 10, 2021

(30) Foreign Application Priority Data

Dec. 10, 2019   (TW) .................... 108145004

(51) Int. Cl.
*G06T 5/00*       (2006.01)
*G06T 5/50*       (2006.01)
*G02B 3/08*       (2006.01)

(52) U.S. Cl.
CPC .......... *G06T 5/006* (2013.01); *G06T 5/50* (2013.01); *G02B 3/08* (2013.01)

(58) Field of Classification Search
CPC ........... G06T 5/006; G06T 5/50; G06T 5/002; G02B 3/08; H04N 17/002
See application file for complete search history.

(56) References Cited

U.S. PATENT DOCUMENTS

| | | | | |
|---|---|---|---|---|
| 6,671,035 | B2* | 12/2003 | Eurlings | G03F 7/701 355/71 |
| 11,385,435 | B2* | 7/2022 | Schweitzer | H01S 3/04 |
| 2009/0303559 | A1* | 12/2009 | Rosen | G03H 1/06 359/9 |
| 2010/0142014 | A1* | 6/2010 | Rosen | G03H 1/041 359/1 |
| 2010/0165306 | A1* | 7/2010 | McGettigan | G02B 19/0047 353/121 |
| 2012/0106866 | A1* | 5/2012 | Minakawa | G06T 5/006 382/274 |
| 2014/0125969 | A1* | 5/2014 | Jordan | A61N 5/1075 356/432 |
| 2016/0363288 | A1* | 12/2016 | McKendry | F21V 5/007 |

(Continued)

FOREIGN PATENT DOCUMENTS

CN    110428457 A   * 11/2019

*Primary Examiner* — Randolph I Chu
(74) *Attorney, Agent, or Firm* — McClure, Qualey & Rodack, LLP

(57) ABSTRACT

A method for eliminating a ring effect is provided. The method includes: capturing, by a camera, a standard ring image generated by light illuminating a standard Fresnel lens; establishing a compensation lookup table according to the standard ring image and obtaining a standard ring center point; capturing, by the camera, a ring image generated by the light illuminating a Fresnel lens to be tested; obtaining a ring center point according to the ring image; obtaining a conversion relationship between the ring center point and the standard ring center point; and performing a compensation procedure on the ring image according to the compensation lookup table and the conversion relationship to eliminate the ring effect in the ring image.

8 Claims, 8 Drawing Sheets

(56) References Cited

U.S. PATENT DOCUMENTS

| | | | | |
|---|---|---|---|---|
| 2017/0091549 A1* | 3/2017 | Gustafsson | ........ | G02B 27/0093 |
| 2017/0305083 A1* | 10/2017 | Smith | ................ | B29D 11/0048 |
| 2018/0074323 A1* | 3/2018 | Wheelwright | ............ | G02B 3/08 |
| 2018/0357804 A1* | 12/2018 | Forutanpour | ........ | H04N 17/002 |
| 2020/0396359 A1* | 12/2020 | Rosen | ....................... | G02B 3/08 |
| 2020/0408973 A1* | 12/2020 | Borrelli | ................ | G02B 5/1885 |
| 2021/0101178 A1* | 4/2021 | Kim | ......................... | G02B 3/08 |
| 2021/0174480 A1* | 6/2021 | Lin | ........................ | G06T 5/002 |
| 2022/0221803 A1* | 7/2022 | Ha | ........................ | G03F 9/7076 |
| 2022/0222535 A1* | 7/2022 | Gervais | ................ | G06K 9/6256 |

\* cited by examiner

METHOD AND DEVICE FOR ELIMINATING RING EFFECT

CROSS REFERENCE TO RELATED APPLICATIONS

This application claims priority from Taiwan Patent Application No. 108145004, filed on Dec. 10, 2019, the disclosure of which is incorporated herein by reference in its entirety.

TECHNICAL FIELD

The present disclosure relates to a method and a device for eliminating the ring effect, and more particularly, it relates to a method and a device for eliminating the ring effect caused by a Fresnel lens.

BACKGROUND

Current virtual reality (VR) head-mounted displays (HMD) almost always use Fresnel lenses in the optical system used for imaging. The main reason is that a Fresnel lens can greatly reduce the thickness of the aspherical lens. However, Fresnel lenses tend to cause ring effects when imaging. FIG. 1 is a schematic diagram of the ring effect caused by a Fresnel lens.

Blemish defects are typically caused by scratches, staining, or foreign objects (such as dust particles) and may be present on an optical surface within the optical imaging path of the Fresnel lens. The principle of blemish detection is to detect the position of a stain by using contour detection after taking a virtual reality image with an industrial camera. However, the ring effect may cause the ring to be mistakenly recognized as a contour during contour detection, which will cause errors in blemish detection.

Therefore, there is a need for a method and device for eliminating the ring effect to improve the above problems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for eliminating the ring effect to improve the above disadvantages.

In an embodiment, a method for eliminating a ring effect is provided in the disclosure. The method comprises: capturing, by a camera, a standard ring image generated by light illuminating a standard Fresnel lens; establishing a compensation lookup table according to the standard ring image and obtaining a standard ring center point; capturing, by the camera, a ring image generated by the light illuminating a Fresnel lens to be tested; obtaining a ring center point according to the ring image; obtaining a conversion relationship between the ring center point and the standard ring center point; and performing a compensation procedure on the ring image according to the compensation lookup table and the conversion relationship to eliminate the ring effect in the ring image.

In an embodiment, a device for eliminating a ring effect is provided. The device comprises one or more processors and one or more computer storage media for storing one or more computer-readable instructions. The processor is configured to drive the computer storage media to execute the following tasks: capturing, by a camera, a standard ring image generated by light illuminating a standard Fresnel lens; establishing a compensation lookup table according to the standard ring image and obtaining a standard ring center point; capturing, by the camera, a ring image generated by the light illuminating a Fresnel lens to be tested; obtaining a ring center point according to the ring image; obtaining a conversion relationship between the ring center point and the standard ring center point; and performing a compensation procedure on the ring image according to the compensation lookup table and the conversion relationship to eliminate the ring effect in the ring image.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
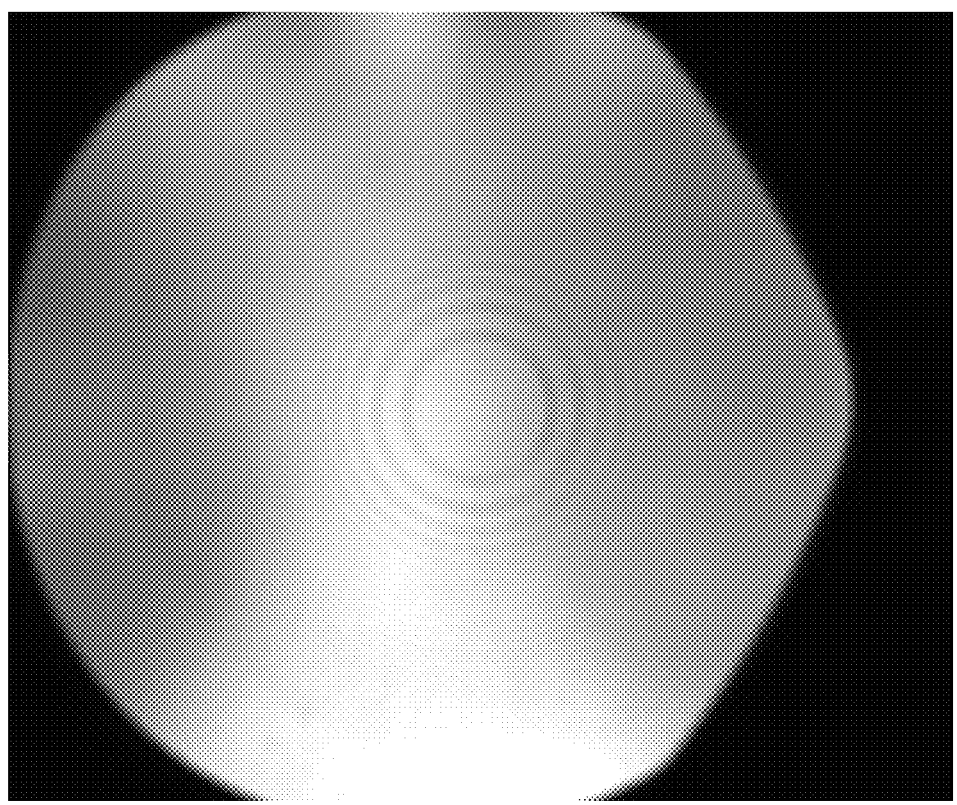
FIG. 1 is a schematic diagram of the ring effect caused by a Fresnel lens.
Figure 2:
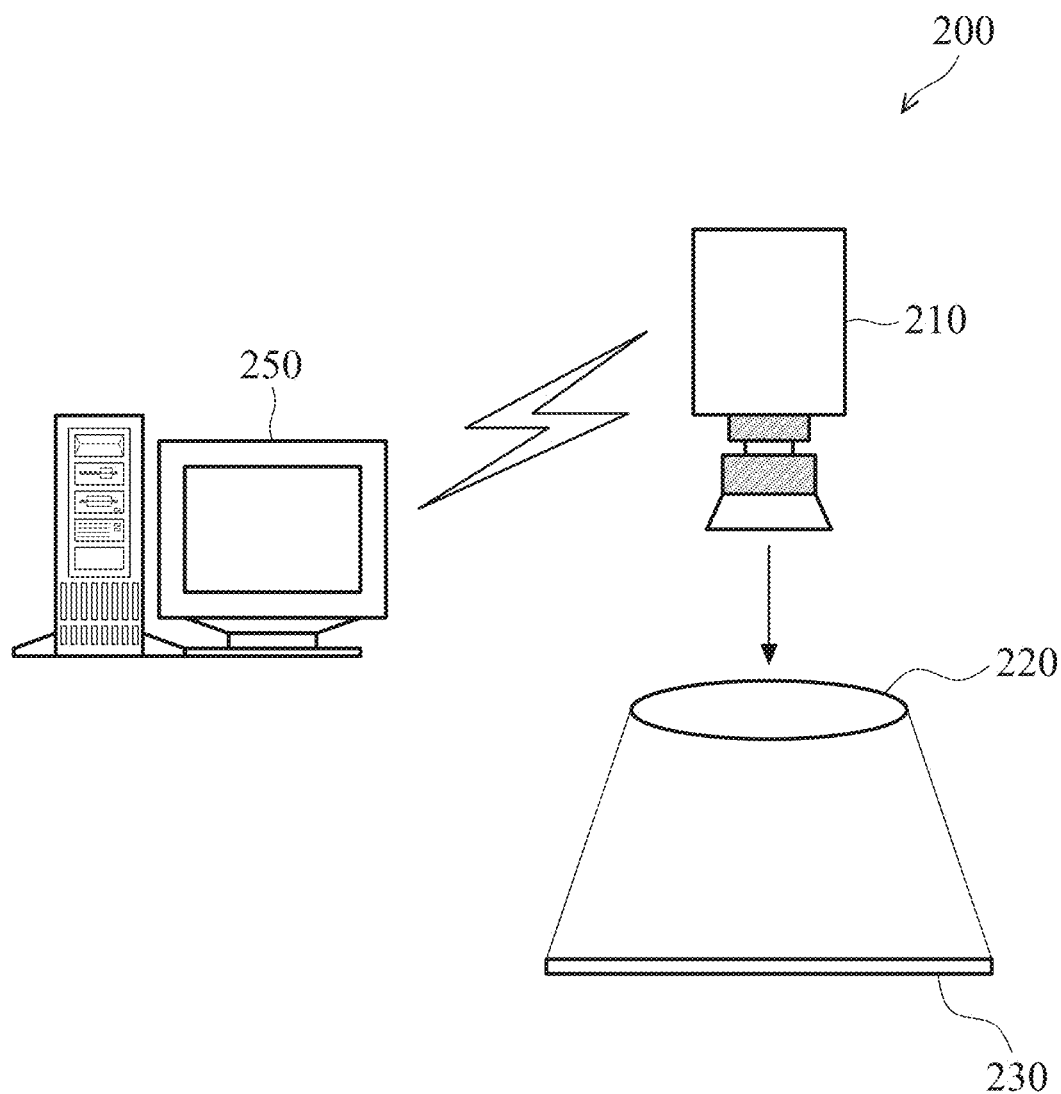
FIG. 2 is a schematic diagram of an environment for eliminating the ring effect caused by a lens according to an embodiment of the disclosure.

FIG. 2 is a schematic diagram 200 of an environment for eliminating the ring effect caused by a lens according to an embodiment of the disclosure. In a specific embodiment, the lens is a Fresnel lens. As shown in FIG. 2, a camera 210 mounted on top captures a ring image on the whiteboard 230, wherein the ring image is generated by light illuminating a Fresnel lens 220. The whiteboard refers to any light-emitting element, such as a Liquid-Crystal Display (LCD), an Organic Light-Emitting Diode (OLED), a Liquid-Crystal On Silicon (LCos) element, or data loss prevention (DLP).

The electronic device 250 may receive a ring image from the camera 210 via a network. The types of recognition device 110 range from small handheld devices, such as mobile telephones and handheld computers to large mainframe systems, such as mainframe computers. Examples of handheld computers include personal digital assistants (PDAs) and notebooks. The network may be any type of network familiar to those skilled in the art, and it may use any of various protocols available on the communication to support data communication, including but not limited to transmission control protocol/Internet protocol (TCP/IP) and the like. For example, the network may be a local area network (LAN), such as Ethernet, etc., a virtual network, including but not limited to a virtual private network (VPN), the Internet, wireless networks, and/or any combination of these and/or other networks.

It should be understood that the electronic device 250 shown in FIG. 2 is an example of one suitable system 200 architecture eliminating the ring effect. Each of the components shown in FIG. 2 may be implemented via any type of computing device.

Figure 3:
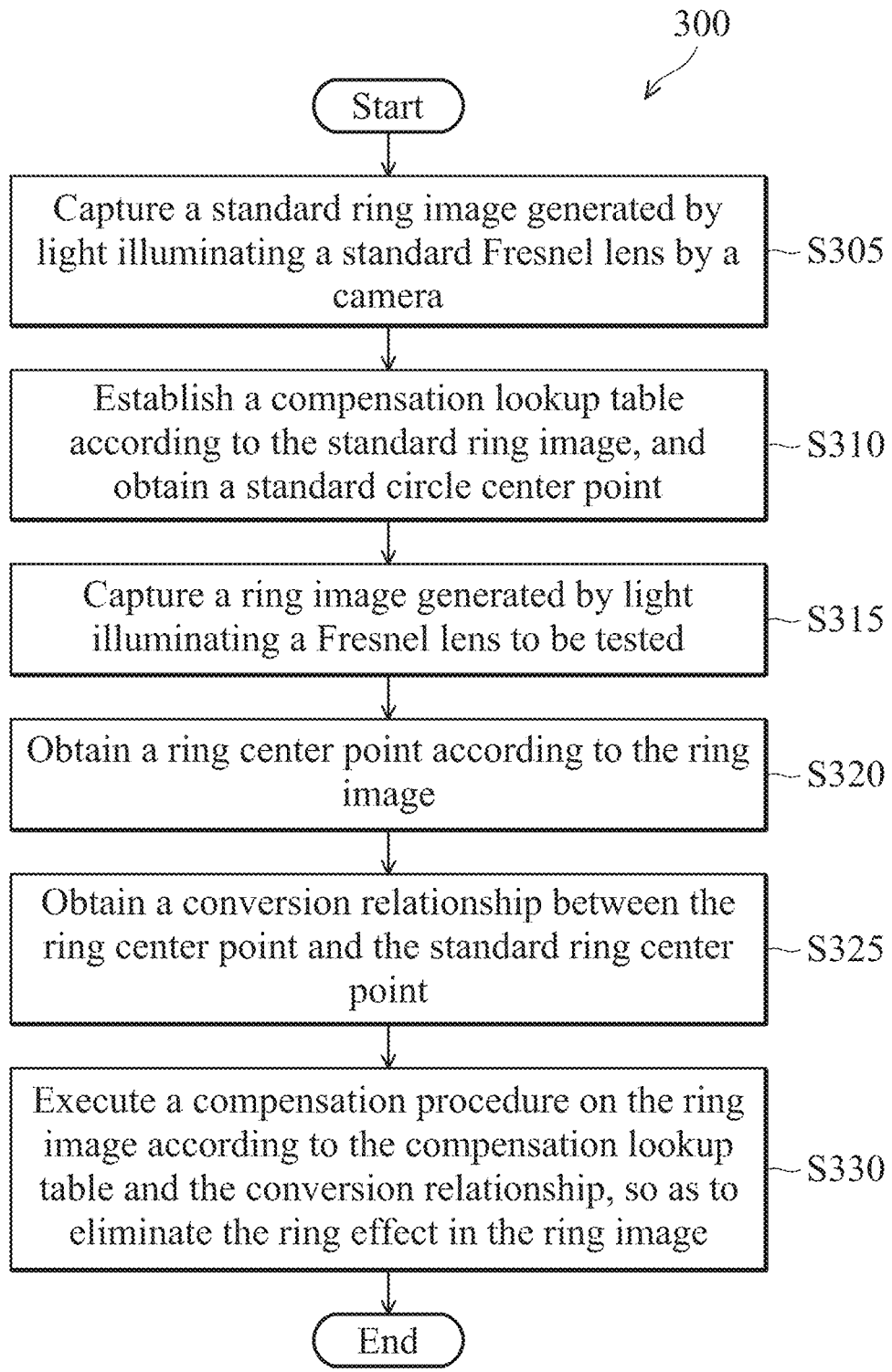
FIG. 3 is a flowchart illustrating a method for eliminating the ring effect according to an embodiment of the present disclosure.

FIG. 3 is a flowchart illustrating a method 300 for eliminating the ring effect according to an embodiment of the present disclosure. The method can be implemented in the processor of the electronic device 250 as shown in FIG. 2.

In step S305, the electronic device captures a standard ring image generated by light illuminating a standard Fresnel lens (i.e., a golden device of a Fresnel lens) by a camera. For the sake of easier illustration of the embodiments of the present disclosure, a standard Fresnel lens and a standard ring image are first defined here. A standard Fresnel lens is defined as a Fresnel lens that is perfectly aligned with the optical axis of the camera and is free from dirt. A standard ring image is defined as a ring image obtained by the camera when the light illuminates the standard Fresnel lens.

In step S310, the electronic device establishes a compensation lookup table according to the standard ring image, and obtains a standard circle center point.

Figure 4A:
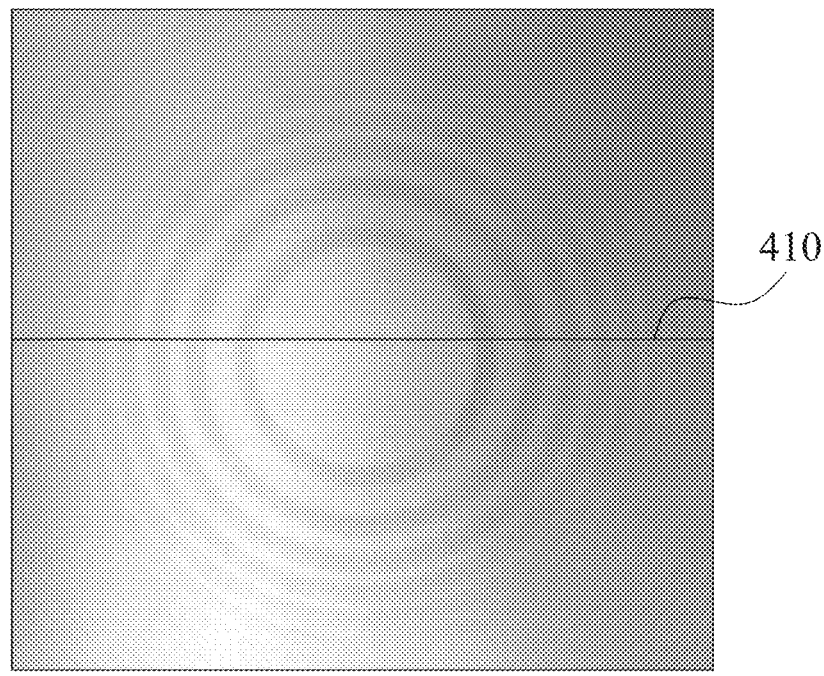
FIG. 4A is a schematic diagram illustrating a standard ring image according to an embodiment of the disclosure.
Figure 4B:
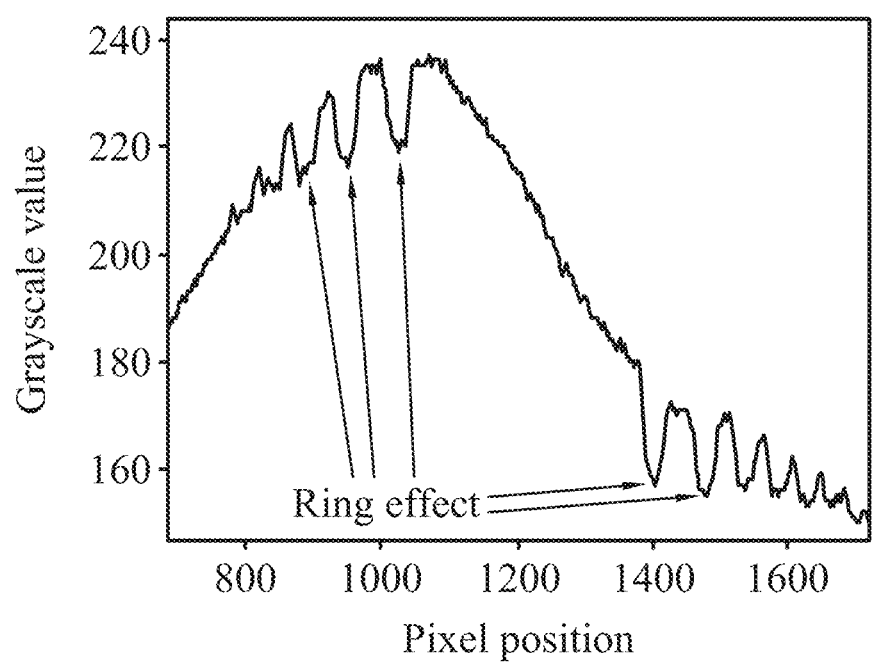
FIG. 4B is a schematic diagram illustrating grayscale values corresponding to the line 410 in FIG. 4A according to an embodiment of the disclosure.

The following will describe in detail how the electronic device establishes a compensation lookup table according to the standard ring image in step S310. FIG. 4A is a schematic diagram illustrating a standard ring image according to an embodiment of the disclosure. As shown in FIG. 4A, when the ring effect occurs, the ring becomes darker. FIG. 4B is a schematic diagram illustrating grayscale values corresponding to the line 410 in FIG. 4A according to an embodiment of the disclosure. As shown in FIG. 4B, the depression is where the ring effect occurs.

The electronic device first obtains an average grayscale value within a range in the center of the standard ring image as shown in FIG. 4A. In one embodiment, the range is a square with a size of 20×20 pixels. Next, the electronic device performs a normalization process on the grayscale value of each pixel in the standard ring image with the average grayscale value, and obtains the normalized compensation value corresponding to each pixel. The electronic device generates the compensation lookup table including the pixels and the normalized compensation values corresponding to each pixel. For example, it is assumed that the average grayscale value of the central range is 250, and the grayscale value of the pixel position (300, 300) is 125. After the normalization process is performed, the normalized compensation value of the pixel is 125/250=0.5. TABLE 1 is an embodiment of a compensation lookup table.

TABLE 1

| Pixel position | Normalized compensation value |
|---|---|
| (300, 300) | 0.5 |
| (300, 301) | 0.45 |
| (300, 302) | 0.45 |
| ... | ... |
| (600, 600) | 0.3 |

It should be noted that the lookup table can be in any form of data/storage structure and/or implemented in hardware/software forms. Alternatively or additionally, the electronic device may use corresponding formula for calculating the normalized compensation value that is implemented in associated hardware and/or software.

Figure 5A:
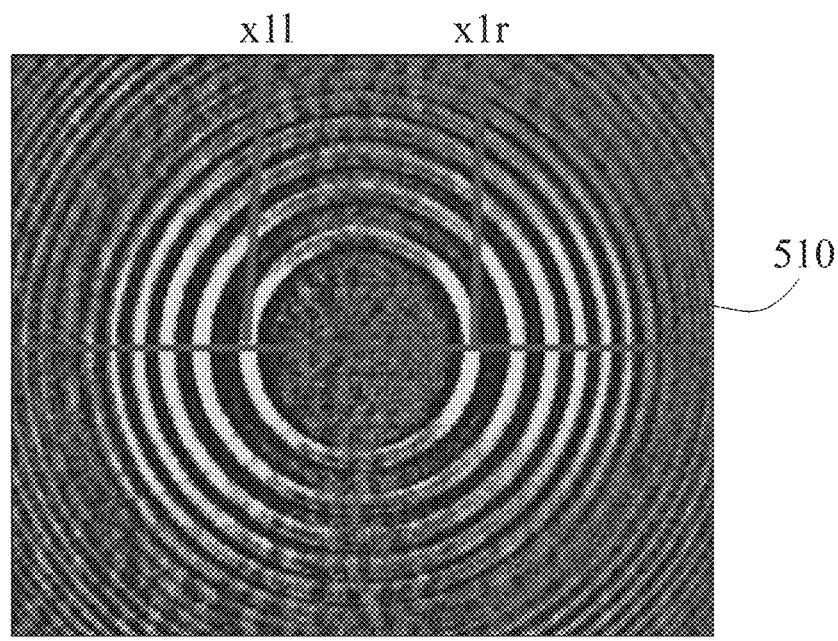
FIG. 5A is a schematic diagram illustrating a standard grayscale ring image according to an embodiment of the disclosure.
Figure 5B:
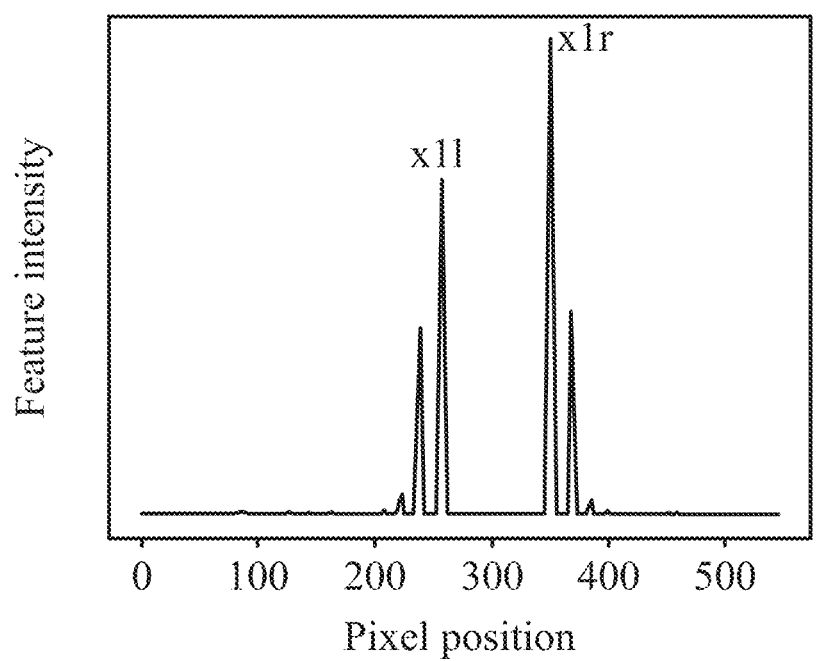
FIG. 5B is a schematic diagram illustrating the feature intensity of a standard grayscale ring image corresponding to the straight line in FIG. 5A according to an embodiment of the disclosure.

Next, it will be described in detail how the electronic device obtains a standard ring center point according to the standard ring image in step S310. First, the electronic device performs a convolution operation using a filter window and a standard ring image to output a standard grayscale ring image, as shown in FIG. 5A. The electronic device may obtain the feature intensity of the standard grayscale ring image corresponding to the straight line 510 in FIG. 5A. FIG. 5B is a schematic diagram illustrating the feature intensity of a standard grayscale ring image corresponding to the straight line 510 in FIG. 5A according to an embodiment of the disclosure. As shown in FIG. 5B, the positions with higher feature strength $x_1l$ and $x_1r$ represent that the feature of the standard grayscale ring at the positions are more obvious.

The electronic device obtains the standard ring center point according to the feature intensity of the standard grayscale ring image. For example, the electronic device may first find the two maximum values of the feature intensity $x_1l$ and $x_1r$, then the ring center coordinate of the standard Fresnel lens in the x-axis direction is $x_1=(x_1l+x_1r)/2$. Similarly, the electronic device may find the ring center coordinate $y_1$ in the y-axis direction of the standard Fresnel lens according to the above steps, wherein the steps are the same as above, so the details of the steps will be omitted. The standard ring center point is $(x_1, y_1)$.

Figure 6A:
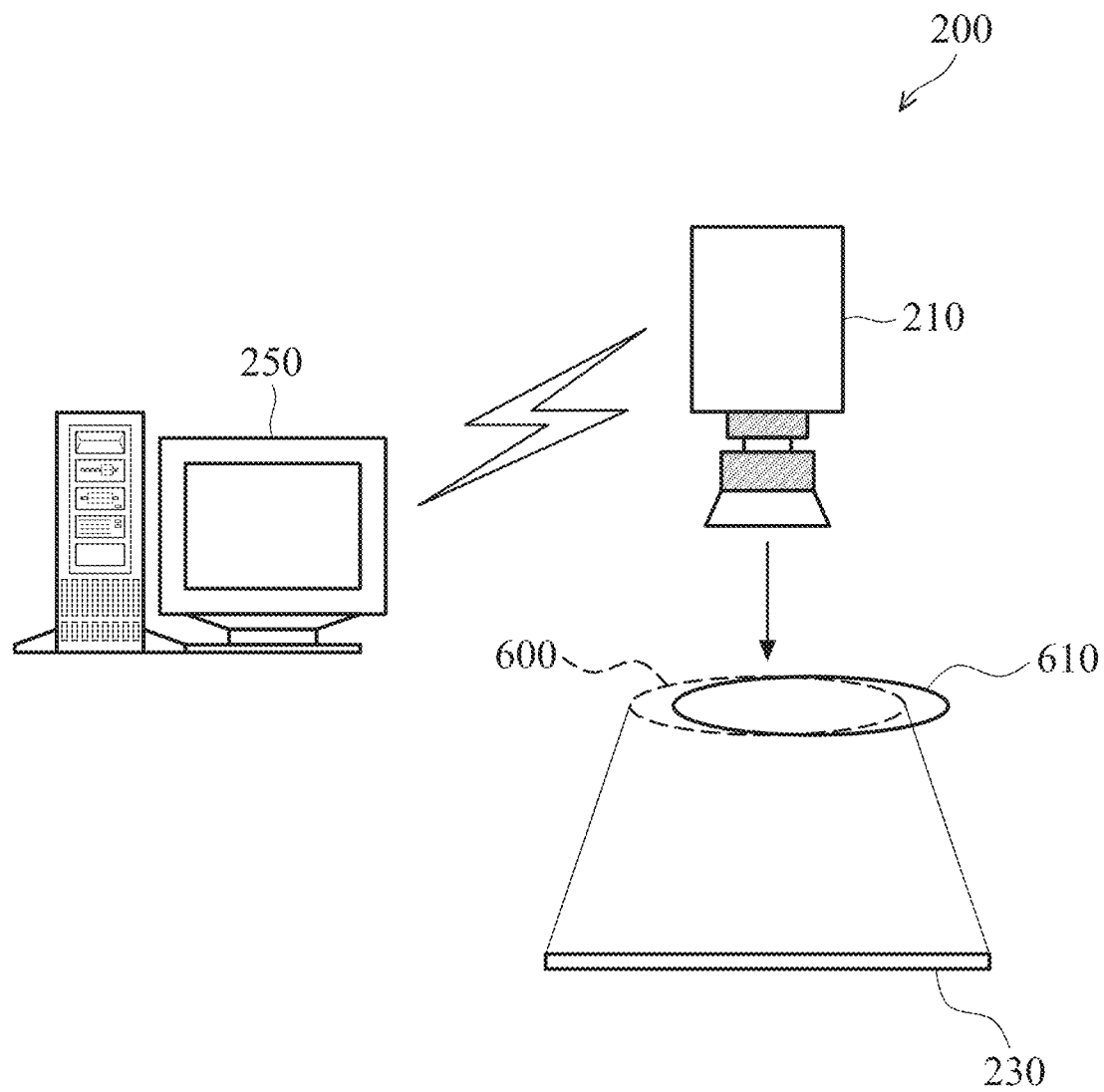
FIG. 6A is a schematic diagram illustrating a case where the placement position of the Fresnel lens to be tested is shifted by a distance from the placement position of the standard Fresnel lens according to an embodiment of the present disclosure.
Figure 6B:
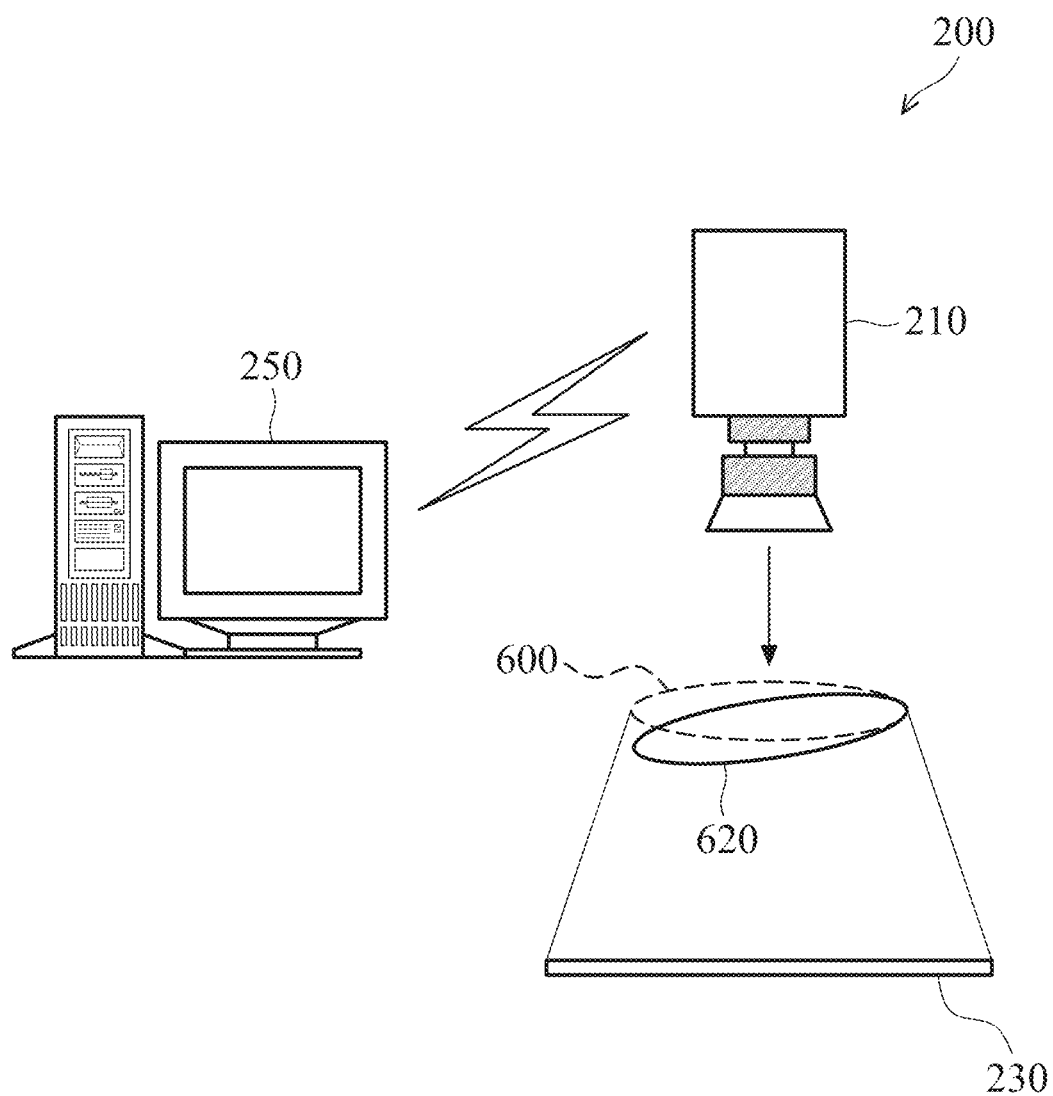
FIG. 6B is a schematic diagram illustrating a case where the placement position of the Fresnel lens to be tested is inclined at an angle compared to the placement position of the standard Fresnel lens according to an embodiment of the disclosure.

Next, in step S315, the electronic device captures a ring image generated by light illuminating a Fresnel lens to be tested. For the sake of easier illustration of the embodiments of the present disclosure, the Fresnel lens to be tested is first defined here. The Fresnel lens to be tested is defined as a Fresnel lens that may be shifted, tilted, or not perfectly aligned with the optical axis of the camera. FIG. 6A is a schematic diagram illustrating the placement position of the Fresnel lens 610 to be tested according to an embodiment of the disclosure. As shown in FIG. 6A, the dotted line shows the placement position of the standard Fresnel lens 600, and the solid line shows the placement position of the Fresnel lens 610 to be tested, wherein the placement position of the Fresnel lens 610 to be tested is shifted by a distance from the placement position of the standard Fresnel lens 600. FIG. 6B is a schematic diagram illustrating the placement position of the Fresnel lens 620 to be tested according to an embodiment of the disclosure. As shown in FIG. 6B, the dotted line shows the placement position of the standard Fresnel lens 600, and the solid line shows the placement position of the Fresnel lens 620 to be tested, wherein the placement position of the Fresnel lens 620 to be tested is inclined at an angle compared to the placement position of the standard Fresnel lens 600.

Then, in step S320, the electronic device obtains a ring center point according to the ring image. Specifically, in step S320, the electronic device may also obtain a ring center point $(x_2, y_2)$ according to the ring image using the same method as mentioned in step S310, so the details of the steps of the method will be omitted.

In step S325, the electronic device obtains a conversion relationship between the ring center point and the standard ring center point. Specifically, the conversion relationship obtained by the electronic device in step S325 may be calculated in two cases. The first case is the case where the placement position of the Fresnel lens to be tested is shifted by a distance from the placement position of the standard Fresnel lens, as shown in FIG. 6A. In this case, the conversion relationship between the ring center point and the standard ring center point is expressed as follows:

$$\begin{bmatrix} x_1 \\ y_1 \end{bmatrix} = \begin{bmatrix} x_0 \\ y_0 \end{bmatrix} + \begin{bmatrix} \Delta t_x \\ \Delta t_y \end{bmatrix} \quad (1)$$

wherein $(x_0, y_0)$ is the ring center point, $(x_1, y_1)$ is the standard ring center point, and $\Delta t_x$ and $\Delta t_y$ are the distances that $x_0$ and $y_0$ shift to $x_1$ and $y_1$, respectively.

The second case is the case where the placement position of the Fresnel lens to be tested is inclined at an angle from the placement position of the standard Fresnel lens, as shown in FIG. 6B. In this case, the conversion relationship between the ring center point and the standard ring center point is expressed as follows:

$$\begin{bmatrix} x_1 \\ y_1 \\ 1 \end{bmatrix} = \begin{bmatrix} s_x\cos\theta & s_x(-\sin\theta) & t_x s_x \cos\theta + t_y s_y(-\sin\theta) \\ s_x\sin\theta & s_y\cos\theta & t_x s_x \sin\theta + t_y s_y \cos\theta \\ 0 & 0 & 1 \end{bmatrix} \times \begin{bmatrix} x_2 \\ y_2 \\ 1 \end{bmatrix} \quad (2)$$

wherein $(x_2, y_2)$ is the ring center point, $(x_1, y_1)$ is the standard ring center point, $$\begin{bmatrix} s_x\cos\theta & s_x(-\sin\theta) & t_x s_x \cos\theta + t_y s_y(-\sin\theta) \\ s_x\sin\theta & s_y\cos\theta & t_x s_x \sin\theta + t_y s_y \cos\theta \\ 0 & 0 & 1 \end{bmatrix}$$

is an affine transform matrix, wherein $s_x$ and $s_y$ are differences of magnification on the X and Y axes before and after correction, respectively, $t_x$ and $t_y$ are displacements in the X-axis and Y-axis directions, respectively, and $\theta$ is the rotation angle.

In step S330, the electronic device executes a compensation procedure on the ring image according to the compensation lookup table and the conversion relationship, so as to eliminate the ring effect in the ring image. Specifically, taking FIG. 6A as an example, the electronic device first shifts the ring image according to the conversion relationship so that the position of the ring center point is the same as that of the standard ring center point. Then, the electronic device executes a compensation procedure on the ring image after the shift according to the compensation lookup table. The compensation lookup table uses TABLE 1 as an example. It is assumed that the grayscale value of the pixel position (300, 300) of the ring image after the shift is 125. The grayscale value 125 is compensated for according to the normalized compensation value 0.5 of TABLE 1, and the value of the grayscale value 125 after compensation is 125/0.5=250. As described above, the grayscale value of each pixel in the ring image after the shift will be compensated for, as shown in TABLE 2.

TABLE 2

| Pixel position | Normalized compensation value | Grayscale value of ring image after shift | Grayscale value after compensation |
|---|---|---|---|
| (300, 300) | 0.5 | 125 | 250 |
| (300, 301) | 0.45 | 100 | 222.22 |
| (300, 302) | 0.45 | 102 | 226.67 |
| ... | ... | ... | ... |
| (600, 600) | 0.3 | 60 | 200 |

Similarly, taking FIG. 6B as an example, the electronic device first shifts the ring image according to the conversion relationship (i.e., the formula (2)), so that the ring center point is in the same position as the standard ring center point. The electronic device then performs a compensation procedure on the ring image after the shift according to the compensation lookup table. The steps of the compensation procedure are also described above, so the details of the steps of the compensation procedure will be omitted.

In another embodiment, after step S330 is performed, the electronic device may perform blemish detection on the ring image in which the ring effect is eliminated.

Figure 7A:
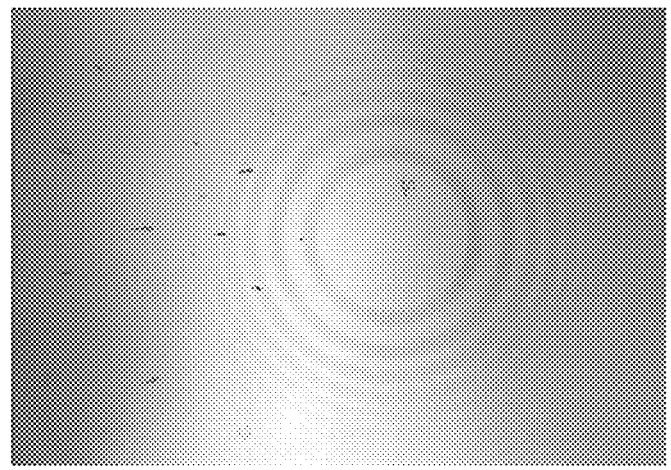
FIG. 7A is a schematic diagram illustrating the ring image before a compensation process is performed according to an embodiment of the disclosure.
Figure 7B:
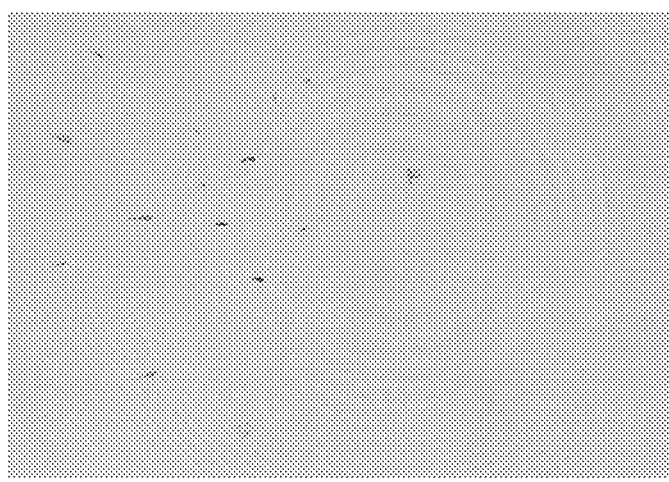
FIG. 7B is a schematic diagram illustrating the ring image after the compensation process is performed according to an embodiment of the disclosure.

FIG. 7A is a schematic diagram illustrating the ring image before a compensation process is performed according to an embodiment of the disclosure. FIG. 7B is a schematic diagram illustrating the ring image after the compensation process is performed according to an embodiment of the disclosure. As shown in FIGS. 7A-7B, the ring effect of the ring image after the compensation process is significantly reduced and the blemish details for blemish detection are retained. In addition, the blemish detection may be directly performed on the compensated ring image to avoid the problem of false detection of blemish detection.

As described above, the method and device for eliminating the ring effect caused by the Fresnel lens disclosed in the present disclosure eliminates the ring effect in the ring image before the blemish detection is performed, thereby avoiding the problem of misjudging the ring as blemishes during the blemish detection and improving the accuracy of blemish detection.

The present disclosure can be executed by one or more processors through computer code or machine-useable instructions. The instructions can include computer-executable instructions of program modules being executed by a computing, or other machine or machines, such as a personal digital assistant (PDA) or other portable device. Generally, program modules include routines, programs, objects, components, data structures, etc. that perform particular tasks or implement particular abstract data types. The disclosure can be implemented in various system configurations, including portable devices, consumer electronics, general-purpose computers, more professional computing devices, and the like. The disclosure can also be implemented in a distributed computing environment to process devices connected by a communication network. The processor is, for example, a CPU (Central Processing Unit), a GPU (Graphics Processing Unit), an MCU (Microcontroller), an ASIC (Special Application Integrated Circuit), an FPGA (Field Programmable Logic Gate Array), and the like.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for eliminating a ring effect, comprising:
capturing, by a camera, a standard ring image generated by light illuminating a standard Fresnel lens;
establishing a compensation lookup table according to the standard ring image and obtaining a standard ring center point;
capturing, by the camera, a ring image generated by the light illuminating a Fresnel lens to be tested;
obtaining a ring center point according to the ring image;
obtaining a conversion relationship between the ring center point and the standard ring center point; and
performing a compensation procedure on the ring image according to the compensation lookup table and the conversion relationship to eliminate the ring effect in the ring image,
wherein the step of establishing a compensation lookup table according to the standard ring image further comprises:
obtaining an average grayscale value within a range in the center of the standard ring image;
performing a normalization process on a grayscale value of each pixel in the standard ring image with the average grayscale value and obtaining a normalized compensation value corresponding to each pixel; and
generating the compensation lookup table including the pixels and the normalized compensation value corresponding to each pixel.

2. The method for eliminating a ring effect as claimed in claim 1, wherein the step of obtaining a ring center point according to the ring image further comprises:
performing a convolution operation using a filter window and the ring image to output a grayscale ring image; and
obtaining the ring center point according to a feature intensity of the grayscale ring image.

3. The method for eliminating a ring effect as claimed in claim 1, wherein the conversion relationship between the ring center point and the standard ring center point is expressed as follows:

$$\begin{bmatrix} x_1 \\ y_1 \end{bmatrix} = \begin{bmatrix} x_0 \\ y_0 \end{bmatrix} + \begin{bmatrix} \Delta t_x \\ \Delta t_y \end{bmatrix}$$

wherein $(x_0, y_0)$ is the ring center point, $(x_1, y_1)$ is the standard ring center point, and $\Delta t_x$ and $\Delta t_y$ are the distances that $x_0$ and $y_0$ shift to $x_1$ and $y_1$, respectively.

4. The method for eliminating a ring effect as claimed in claim 1, wherein the conversion relationship between the ring center point and the standard ring center point is expressed as follows:

$$\begin{bmatrix} x_1 \\ y_1 \\ 1 \end{bmatrix} = \begin{bmatrix} s_x\cos\theta & s_x(-\sin\theta) & t_x s_x\cos\theta + t_y s_y(-\sin\theta) \\ s_x\sin\theta & s_y\cos\theta & t_x s_x\sin\theta + t_y s_y\cos\theta \\ 0 & 0 & 1 \end{bmatrix} \times \begin{bmatrix} x_2 \\ y_2 \\ 1 \end{bmatrix}$$

wherein $(x_2, y_2)$ is the ring center point, $(x_1, y_1)$ is the standard ring center point, $$\begin{bmatrix} s_x\cos\theta & s_x(-\sin\theta) & t_x s_x \cos\theta + t_y s_y(-\sin\theta) \\ s_x\sin\theta & s_y\cos\theta & t_x s_x \sin\theta + t_y s_y \cos\theta \\ 0 & 0 & 1 \end{bmatrix}$$

is an affine transform matrix, wherein $s_x$ and $s_y$ are differences of magnification on the X and Y axes before and after correction, respectively, $t_x$ and $t_y$ are displacements in the X-axis and Y-axis directions, respectively, and $\theta$ is the rotation angle.

5. A device for eliminating a ring effect, comprising:
one or more processors;
wherein the processor is configured to execute the following tasks through computer-executable instructions:
capturing, by a camera, a standard ring image generated by light illuminating a standard Fresnel lens;
establishing a compensation lookup table according to the standard ring image and obtaining a standard ring center point;
capturing, by the camera, a ring image generated by the light illuminating a Fresnel lens to be tested;
obtaining a ring center point according to the ring image;
obtaining a conversion relationship between the ring center point and the standard ring center point; and
performing a compensation procedure on the ring image according to the compensation lookup table and the conversion relationship to eliminate the ring effect in the ring image,
wherein the step of establishing a compensation lookup table according to the standard ring image performed by the processor further comprises:
obtaining an average grayscale value within a range in the center of the standard ring image;
performing a normalization process on a grayscale value of each pixel in the standard ring image with the average grayscale value and obtaining a normalized compensation value corresponding to each pixel; and
generating the compensation lookup table including the pixels and the normalized compensation value corresponding to each pixel.

6. The device for eliminating a ring effect as claimed in claim 5, wherein the step of obtaining a ring center point according to the ring image performed by the processor further comprises:

performing a convolution operation using a filter window and the ring image to output a grayscale ring image; and
obtaining the ring center point according to a feature intensity of the grayscale ring image.

7. The device for eliminating a ring effect as claimed in claim 5, wherein the conversion relationship between the ring center point and the standard ring center point is expressed as follows:

$$\begin{bmatrix} x_1 \\ y_1 \end{bmatrix} = \begin{bmatrix} x_0 \\ y_0 \end{bmatrix} + \begin{bmatrix} \Delta t_x \\ \Delta t_y \end{bmatrix}$$

wherein $(x_0, y_0)$ is the ring center point, $(x_1, y_1)$ is the standard ring center point, and $\Delta t_x$ and $\Delta t_y$ are the distances that $x_0$ and $y_0$ shift to $x_1$ and $y_1$, respectively.

8. The device for eliminating a ring effect as claimed in claim 5, wherein the conversion relationship between the ring center point and the standard ring center point is expressed as follows:

$$\begin{bmatrix} x_1 \\ y_1 \\ 1 \end{bmatrix} = \begin{bmatrix} s_x\cos\theta & s_x(-\sin\theta) & t_x s_x \cos\theta + t_y s_y(-\sin\theta) \\ s_x\sin\theta & s_y\cos\theta & t_x s_x \sin\theta + t_y s_y \cos\theta \\ 0 & 0 & 1 \end{bmatrix} \times \begin{bmatrix} x_2 \\ y_2 \\ 1 \end{bmatrix}$$

wherein $(x_2, y_2)$ is the ring center point, $(x_1, y_1)$p is the standard ring center point, $$\begin{bmatrix} s_x\cos\theta & s_x(-\sin\theta) & t_x s_x \cos\theta + t_y s_y(-\sin\theta) \\ s_x\sin\theta & s_y\cos\theta & t_x s_x \sin\theta + t_y s_y \cos\theta \\ 0 & 0 & 1 \end{bmatrix}$$

is an affine transform matrix, wherein $s_x$ and $s_y$ are differences of magnification on the X and Y axes before and after correction, respectively, $t_x$ and $t_y$ are displacements in the X-axis and Y-axis directions, respectively, and $\theta$ is the rotation angle.

* * * * *